United States Patent [19]
Ruiz Santa Quiteria et al.

[11] Patent Number: 5,326,838
[45] Date of Patent: Jul. 5, 1994

[54] METHOD OF PREPARING HOMOPOLYMERS OF CONJUGATE DIENES AND COPOLYMERS OF CONJUGATE DIENES WITH OTHER DIENES OR VINYL AROMATIC COMPOUNDS

[75] Inventors: V. Ruiz Santa Quiteria, Madrid; M. D. Parellada Ferrer, Coslada; W. Michiels Vega, Alcala de Henares; M. A. Madueño Casado, Puertollano; A. Mendez Perez, Bilbao, all of Spain

[73] Assignee: Repsol Quimica, S.A., Madrid, Spain

[21] Appl. No.: 996,845

[22] Filed: Dec. 16, 1992

Related U.S. Application Data

[63] Continuation of Ser. No. 722,908, Jun. 28, 1991, abandoned.

[30] Foreign Application Priority Data

Jun. 29, 1990 [ES] Spain ............,.................. P9001799

[51] Int. Cl.$^5$ ............................ C08F 4/54; C08F 36/06
[52] U.S. Cl. ..................................... 526/187; 526/185; 526/189; 526/336; 526/340; 525/249; 525/332.2
[58] Field of Search ............... 526/187, 189, 336, 185, 526/340, 188; 525/249, 332.2

[56] References Cited

U.S. PATENT DOCUMENTS

| | | |
|---|---|---|
| 3,268,500 | 8/1966 | Royston . |
| 3,550,158 | 12/1970 | Natta et al. . |
| 3,629,213 | 12/1971 | Akira et al. . |
| 3,992,561 | 11/1976 | Hargis et al. . |
| 4,116,869 | 9/1978 | Hsieh ........................ 526/187 X |
| 4,424,322 | 1/1984 | Hattori et al. ............. 526/176 X |
| 4,503,204 | 3/1985 | Bingham et al. ............. 526/187 |
| 5,093,295 | 3/1992 | Tomotsu et al. ............. 526/160 X |

FOREIGN PATENT DOCUMENTS 0061920 10/1982 European Pat. Off. .
2524849 12/1975 Fed. Rep. of Germany .

Primary Examiner—Fred Teskin
Attorney, Agent, or Firm—Wolf, Greenfield & Sacks

[57] ABSTRACT

A method of preparing homopolymers of conjugate dienes and copolymers of conjugate dienes with other dienes or with vinyl aromatic compounds, by means of which the aforementioned monomers are polymerised by using a complex catalytic composition basically comprising (a) an organomagnesium compound, (b) an organoaluminium compound and (c) an organic compound of phosphorus P(V) or P(III), of the metals barium, strontium or calcium. The method according to the invention is for producing homopolymers of 1,3-butadiene and copolymers of butadiene and styrene in random manner, with a high 1,4-trans addition content (above 70%) and vinyl addition below 5%. The method is also used to prepare block copolymers of the aforementioned monomers.

12 Claims, No Drawings

METHOD OF PREPARING HOMOPOLYMERS OF CONJUGATE DIENES AND COPOLYMERS OF CONJUGATE DIENES WITH OTHER DIENES OR VINYL AROMATIC COMPOUNDS

This application is a continuation of application Ser. No. 07/722,908, filed Jun. 28, 1991 abandoned.

THE PRIOR ART

Some well-known catalytic systems can be used for producing polymers in hydrocarbon solvents with a high degree of stereospecificity. The same purpose has been served in some cases by using Ziegler-Natta-type catalytic systems mainly comprising compounds of transition metals in groups IVb to IIIa, for polymerisation of dienes with 90–99% 1,4-trans addition (U.S. Pat. Nos. 3,268,500 and 5,550,158). However, these catalysts have the disadvantage of being not soluble in hydrocarbon polymerisation solvents, and produce branched polymers with a very wide distribution of molecular weights. On the other hand, random copolymerisation of a diene and a vinyl aromatic compound has not been described in the case of any of these catalytic systems.

Another method of polymerising dienes with a high 1,4-trans addition content has been described in U.S. Pat. No. 3,629,213, using an organolithium in combination with a barium compound, which between them produce barium stearate and barium t-butoxide, the latter being characterised in that it produces random copolymers of certain dienes and vinyl aromatic compounds. The content of trans isomer is not greater than 68% in any of the examples in the cited invention, and the vinyl content is 8–13%.

U.S. Pat. No. 3,992,561 discloses use of barium t-butoxide hydroxide, $(^tBuO)_x(OH)_{2-x}Ba$, in combination with n-butyl lithium, for preparing polybutadiene and copolymers of dienes and a vinyl aromatic compound. The monomers used in the examples are 1,3-butadiene and styrene, the content of trans in the butadiene fraction being up to 80%. However, these polymers have an extremely wide distribution of molecular weights, and the method of preparing barium alkoxides is complex, since it involves the use of liquid ammonia or monomethyl amine as the solvent.

European patent application EP 61902 describes an initiator using a barium t-butoxide in combination with an organometallic sodium compound for polymerising 1,3-butadiene and copolymerisation thereof with styrene. In the examples which are included, the content of trans in the polymers does not exceed 54%.

The use of a compound of barium, such as barium nonyl phenolate, barium t-butoxide or barium acetyl acetonate in combination with a lithium organometallic compound or a Lewis acid such as an alkyl aluminium or alkyl zinc, has been found effective as a catalytic combination in the preparation of butadiene-styrene copolymers containing up to 83% trans, and 18% styrene compositions, as described in German patent GP 2 524 849.

Finally, U.S. Pat. No. 4,503,204 describes the preparation of homopolymers of 1,3-butadiene and copolymers thereof with styrene in which the 1,4-trans addition content is high (up to 85–90%) with a low vinyl addition content (2–3%). The catalytic composition used comprises (a) an organoaluminium-organomagnesium complex, more specifically dibutyl magnesium and triethyl aluminium, and (b) a barium, calcium and-/or strontium salt from alcohols or alcohols and water; the cited invention describes a complicated method of preparing these salts from barium metal, alcohols and water in liquid ammonium or monomethyl amine to obtain the complex $(^tBuO)_x(^tDecO)_y(OH)_{2-x-y}Ba$. This catalytic composition is useful for preparing butadiene-styrene copolymers, though it has been observed that butadiene is more reactive than styrene.

Surprisingly, we have discovered that a novel catalytic system based on an organic compound of P(III) or P(V) of the metals barium, strontium and calcium, in combination with an organomagnesium or organoaluminium, can be used to prepare homopolymers of conjugate dienes and copolymers of dienes with other dienes or a vinyl aromatic compound. The complex occurring in the catalytic mixture being very easy to prepare compared with the other previously-described systems, and the product being homopolymers of 1,3-butadiene or copolymers of 1,3-butadiene and styrene with 1,4-trans addition contents above 70% and a vinyl content below 5% and relatively narrow distributions of molecular weight. The organic compound of the alkaline earth metal can be prepared by a simple acid-base or metal interchange reaction, which can occur even in the absence of inert atmosphere owing to the stability of the mixture, resulting in advantages both regarding the simplicity of the method of preparing the alkaline earth compound and with regard to subsequent handling thereof, a very important factor in an industrial process compared with the complicated methods of preparation described hereinbefore.

On the other hand, an important additional advantage which has been observed compared with the previously-described processes is the stability of the resulting polymer, including its transit through the finishing phases. In contrast to conventional products obtained in the presence of alkaline earth metal alkoxides, the substance obtained by the present method is colourless, which indicates its high stability.

DESCRIPTION

It has been discovered that one or more vinyl monomers having a double activated bond and not containing groups which can destroy the active complex, can polymerise under inert conditions in a hydrocarbon solvent in which the monomers and the polymers are soluble, using a catalytic composition corresponding to the following combination:

(a) an organomagnesium compound
(b) an organoaluminium compound
(c) an ester type P(V) or P(III) compound of the metals barium, strontium or calcium where the molar proportions of compound (a) to (b) may vary between 100/1 and 2/1, and the molar proportion of the barium compound to the magnesium compound must be between 2.0 and 0.1, since no appreciable activity has been observed below these lower limits.

The organomagnesium compound (a) occurring in the aforementioned catalytic composition can be represented by the following formula:

$$R^1MgR^2 \qquad (I)$$

where $R^1$ and $R^2$ can be the same or different and are selected from among normal, secondary or tertiary alkyl groups, cycloalkyl radicals or aryl radicals containing 2 to 20 carbon atoms, preferably di-n-butyl magnesium, n-butyl-sec-butyl magnesium, n-butyl-octyl magnesium, n-butyl-ethyl magnesium, or di-n-hexyl magnesium.

The aluminium compound (b) can be represented by the following formulae:

$$R^3—Al—R^4 \quad\quad (II)$$
$$\phantom{R^3—Al—}R^5$$

$$(—O—Al(R^6)—O—)_n \quad\quad (III)$$

$$R^7—O—Al—R^8 \quad\quad (IV)$$
$$\phantom{R^7—O—Al—}R^9$$

$$R^{10} \quad\quad R^{12} \quad\quad (V)$$
$$\phantom{R^{10}}Al—O—Si—R^{13}$$
$$R^{11} \quad\quad R^{14}$$

where the groups $R^3$ to $R^{14}$ can be H or the same or different radicals, selected from among normal secondary or tertiary alkyl, cycloalkyl or aryl radicals containing 2 to 20 carbon atoms, e.g. the following in the case of trialkyl aluminium: triethyl aluminium, triisobutyl aluminium, trioctyl aluminium; in the case of alkoxy or aryloxy dialkyl aluminium: 4-methoxyphenoxy-diethyl aluminium or phenoxydiethyl aluminium; in the case of aluminoxanes: tetra-iso butyl aluminoxane or methyl aluminoxane, or in the case of siloxals or siloxalanes, substances such as: ethyl-dimethyl siloxy-diethyl aluminium, ethyl-hydroxymethyl siloxy-diethyl aluminium (siloxal H. Schering). A combination of various aforementioned compounds may also be used.

The barium, strontium or calcium compound (c) corresponds to a salt of an ester phosphate, phosphonate or derivative of phosphonic acid P(V), or phosphite, derivative of phosphonous acid or derivative of phosphinous acid, P(III) of the type represented by the following formulae:

$$\phantom{Me \ \ }O \quad\quad\quad\quad (VI)$$
$$Me \ \ (O—P—R^{15})_2$$
$$\phantom{Me \ \ (O—P—}R^{16}$$

$$Me \ \ (O—P—R^{17})_2 \quad\quad (VII)$$
$$\phantom{Me \ \ (O—P—}R^{18}$$

where the type (VI) compound represents a phosphate or phosphonate ester or phosphinic acid derivative of P(V) and the type (VII) compound represents an ester phosphite or phosphinous acid derivative or phosphonous derivative of P(III), in which $R^{15}$ to $R^{18}$ are the same or different groups and derived from alkyl, cycloalkyl, aryl, phenoxy or alkoxy radicals containing at least 4 carbon atoms, and Me is one of the metals Ba, Sr or Ca, the following being examples: bis-(2-ethylhexyl)-phosphate, dioleyl phosphate, diphenyl phosphate, bis-(p-nonylphenyl)phosphate, mono-p-nonylphenyl-2-ethylhexyl phosphonate, mono-2-ethylhexyl-2-ethylhexyl phosphonate, or bis(2-ethylhexyl) phosphite of the aforementioned metals.

The type (c) compounds can be prepared in simple manner from the corresponding acid or by interchange of the metal with the sodium salt of the corresponding acid and by the methods described in the prior-art literature with reference to the preparation of salts of these organic phosphorus derivatives.

The mixture of the components in the complex initiator system described in the present invention may optionally be subjected to preliminary ageing in the absence of the monomers, by mixing the organic phosphorus derivative of barium, strontium and calcium and the alkyl magnesium and alkyl aluminium compounds for 15 to 60 minutes. Use may likewise be made of previously-prepared combinations of the organomagnesium compound (a) and organoaluminium compound (b), selected in a suitable molar proportion in combination with the previously-mentioned compound (c).

Another feature of this novel catalytic system is the absence of activity when the magnesium or barium compound is absent.

The method of polymerisation according to the invention can be brought about in the absence of a solvent, but is usually carried out preferably in the presence of a hydrocarbon solvent. The solvent is preferably an aliphatic or cycloaliphatic hydrocarbon such as n-pentane, n-hexane, n-heptane, cyclohexane or the like. It can be a mixture of one or more components, but must be substantially free from impurities such as $CO_2$, $O_2$ or water, which may affect the active centre of polymerisation. The concentration of solvent will be chosen such that the reaction mixture can be easily agitated and the heat produced therein can be easily dissipated.

The method according to the invention is for polymerising conjugate dienes and copolymerising conjugate dienes with other vinyl aromatic monomers. The conjugate dienes can be e.g. 1,3-butadiene, 2-methyl-butadiene (isoprene), 1,3-pentadiene, 1,3-hexadiene, etc. The vinyl aromatic monomer can be e.g. styrene, alpha-methyl styrene, p-methyl styrene, etc. This method can be used to prepare random copolymers of 1,3-butadiene with the desired composition, and also to prepare block copolymers of the aforementioned monomers.

The polymerisation temperature can be between 0° and 150° C., preferably between 40° and 120° C. It has been observed that the temperature influences both the reaction rate and the microstructure of the polymer. The reaction can be carried out either in a continuous reactor or a discontinuous reactor.

The molecular weight of the polymer can be checked via the variation in the concentration of catalyst and the degree of conversion. The distribution of molecular weights obtained is usually narrow; the polydispersity index can be increased by using a branching agent such as divinyl benzene (DVB) at the beginning or end of the reaction.

When the desired degree of polymerisation has been obtained, the reaction can be stopped by adding a known reaction-finishing agent such as an alcohol or phenol or water, followed by elimination of the solvent and drying, i.e. the conventional treatment in the production of homopolymers of butadiene or copolymers of butadiene and styrene, so as to separate the polymer from the reaction mixture. Before the solvent is eliminated, antioxidants can be added to the polymer, e.g. 2,6-di-tert-butyl-p-cresol or other stabilising additives known in the art. The polymers obtained according to the invention have excellent stability and are practically free from colour, in contrast to those obtained with other barium systems such as barium alkoxide, which generally show color.

The time required for polymerisation depends on the reaction temperature, the quantity of catalyst, the desired type of polymer and the initial concentration of butadiene and styrene. The quantity of catalyst, expressed as a magnesium compound, will depend on the molecular weight of the required polymer. The quantities of catalyst required to obtain a polymer with a molecular weight between 10,000 and 500,000 will vary between 1.5 and 20 mmol of magnesium compound per 100 g of monomer. The molecular weight increases inversely with the proportion of catalyst relative to the monomer, expressed as a magnesium compound, and the conversion rate increases similarly. The quantities will be substantially greater if it is desired to obtain a branched polymer with DVB, since the latter substance will have a strong effect on increasing the average size of the molecule. Any skilled addressee can easily determine the optimum reaction conditions for preparing a polymer or copolymer having the desired composition and molecular weight.

The polymerisation rate also increases with the proportion of diene to vinyl aromatic hydrocarbon, so that copolymers can generally be prepared with the desired composition.

Polymerisation can be brought about in a sealed reactor provided with heating and monitoring systems, a nitrogen, argon or neon supply system, and venting means as well. Systems will also be provided for loading raw materials and discharging the polymer solution.

The invention will be described in detail in the following examples, which show the most convenient manner of preparing these elastomers, and will be much more clear to those skilled in the art.

Unless otherwise stated, the polymerisation operations were carried out in sealed glass bottles with a rubber gasket and formed crown cap formed with three perforations through which monomers, solvents, catalysts and a substance terminating the reaction could be introduced through hypodermic needles coupled to the systems for metering the raw materials.

In all cases the solvent was cyclohexane, purified by passing through alumina columns. The butadiene and-styrene are also purified by passing through alumina columns.

Although it is stated that each compound in the catalytic composition is added separately, it is pointed out that the three compounds can be added after being mixed in the right proportion or, if desired, the barium compound can be added with a mixture of aluminium and magnesium, since no significant differences have been observed.

Likewise, the order in which the compounds in the catalytic composition are separately added can be altered, always providing the reactor and raw materials are free from the previously-mentioned impurities.

The following examples illustrate the invention without in any way limiting it.

EXAMPLES

Example 1

A stream of nitrogen was passed for 5 minutes through two polymerisation bottles having an internal capacity of 500 ml and previously washed with water and dried overnight at 120° C. The bottles were then sealed with a septum and a crown cap. 330 ml of previously purified cyclohexane was introduced into each bottle through a hypodermic needle through orifices existing in the crown cap, and was followed by 42 g of 1,3-butadiene in the bottle corresponding to test 1 and 42 g of styrene in the bottle corresponding to test 2. The bottles were then placed in a thermostatic bath provided with an agitation system for the bottles, until the temperature reached 50° C., after which the following were added in the following order: 0.278 mmol of n-butyl-octyl magnesium (12% solution in heptane) followed by 0.056 mmol of triethyl aluminium (10% solution in heptane) and 0.083 mmol of bis (2-ethyl hexyl) barium phosphate, prepared from the corresponding acid, noting that the system was completely homogeneous and that from this instant there was a progressive increase in viscosity in the solution, indicating that polymerisation was occurring.

After a 24-hour reaction during which the temperature was kept constant at the stated value, the stoichiometric quantity of 2,6-ditert-butyl-p-cresol was added to terminate the reaction, with an additional 0.5 phr of this compound as an antioxidant. The resulting solution was poured on to isopropyl alcohol, thus precipitating a polymer which was subsequently dried in a vacuum oven at $10^{-2}$ mm Hg and at 60° C. for 24 hours.

The synthesis conditions and the structural parameters of polymers are given in Table 1.

TABLE 1

| Test | Monomer (mmol) | $R_2Mg$ (mmol) | $R_2'Ba$ (mmol) | $R_3''Al$ (mmol) | % conversion | POLYBUTADIENE % 1,4-trans | % 1,2 |
|---|---|---|---|---|---|---|---|
| 1 | Butadiene | 0.380 | 0.114 | 0.076 | 93 | 88 | 2 |
| 2 | Styrene | 0.380 | 0.114 | 0.076 | 66 | — | — |

Microstructure: IR
$T_{polymerisation}$: 50° C.
Time: 24 hours

Example 2

The same polymerisation procedure was followed as in Example 1 but different compounds of alkaline earth metals were used, in order to show their advantage when polymerising butadiene-styrene copolymers with high 1,4-trans addition. 330 ml of cyclohexane followed by 30.3 g of 1,3-butadiene and 10.1 g of styrene were introduced into three glass bottles. After the bottles had been thermostatised at the test temperature of 50° C., the following were added in the following order: 0.760 mmol of n-butyl-octyl magnesium, 0.152 mmol of triethyl aluminium and 0.228 mmol of the compound of barium, strontium and calcium in tests 3, 4 and 5 respectively as shown in Table II.

After 24 hours the reaction was stopped and the sample was isolated by the procedure given in Example 1. Table II also gives the conversion percentage and the microstructure and composition data obtained by IR. Note that the highest conversion rates and the highest 1,4-trans addition contents are obtained for the barium salt and the lowest for calcium.

None of the polymers obtained had a residue through degradative oxidation with hydroperoxide, and this indicates absence of block polystyrene, at least in the form of long sequences.

TABLE II

| Test | Alkaline earth compound | $R_2Mg$ (mmol) | $R_2'Ba$ (mmol) | $R_3''Al$ (mmol) | % conversion | COMPOSITION OF COPOLYMER % styrene | % 1,4-trans | % 1,2 |
|---|---|---|---|---|---|---|---|---|
| 3 | $BaP_2$* | 0.760 | 0.228 | 0.152 | 84 | 17.9 | 84.7 | 1.5 |

TABLE II-continued

|  | Alkaline earth | R₂Mg | R₂'Ba | R₃"Al |  | COMPOSITION OF COPOLYMER | | |
|---|---|---|---|---|---|---|---|---|
| Test | compound | (mmol) | (mmol) | (mmol) | % conversion | % styrene | % 1,4-trans | % 1,2 |
| 4 | SrP₂* | 0.760 | 0.228 | 0.152 | 67 | 7.3 | 76.7 | 7.3 |
| 5 | CaP₂* | 0.760 | 0.228 | 0.152 | 44 | 6.0 | 72.6 | 6.5 |

Microstructure and composition: IR
T$_{polymerisation}$: 50° C.
Time: 24 hours
P₂*: bis(2-ethylhexyl) phosphate

Example 3

Butadiene-styrene copolymers in glass bottles were obtained by the same reaction process as in Example 1. However, the quantities of monomers, solvent and catalyst used were as described hereinafter.

320 ml of cyclohexane purified by passing through alumina towers was introduced, followed by 32.2 g of 1.3-butadiene and 8.1 g styrene. This was followed by 0.456 mmol of n-butyl-octyl magnesium and varying quantities of bis-(2-ethylhexyl)phosphate of barium and the aluminium compound as shown in the synthesis data in Table III.

After 24 hours, the reaction was stopped by adding a stoichiometric quantity of 2,6-ditert-butyl-p-cresol and 0.5 phr added as an anti-oxidising agent. Butadiene-styrene copolymers were obtained by precipitation in isopropyl alcohol, and the structural and composition parameters thereof are given in Table III. Copolymerisation was practically random, as is deduced from the fact that no residue through degradative oxidation of the samples with hydroperoxide was observed during the analysis.

TABLE III

|  | R₂Mg | R₂'Ba | R₃"Al |  | COMPOSITION OF COPOLYMER | | |
|---|---|---|---|---|---|---|---|
|  |  |  |  |  | Styrene | Butadiene | |
| Test | (mmol) | (mmol) | (mmol) | % conversion | % total | % trans | % 1,2 |
| 6 | 0.456 | 0.137 | 0.091* | 83 | 16.3 | 84.0 | 3.3 |
| 7 | 0.456 | 0.228 | 0.091* | 81 | 15.2 | 77.5 | 4.3 |
| 8 | 0.380 | 0.137 | 0.150* | 65 | 14.5 | 87.2 | 2.2 |
| 9 | 0.380 | 0.114 | 0.076** | 74 | 14.0 | 89.9 | 1.3 |
| 10 | 0.380 | 0.114 | 0.076*** | 73 | 13.6 | 86.1 | 2.7 |

Microstructure and composition: IR
t$_{reaction}$: 24 hours
T$_{polymerisation}$: 65° C.
*triethyl aluminium
**ethyl-dimethyl-diethyl siloxalane
***4-methyoxyphenoxy-diethyl aluminium

Example 4

The influence of temperature on the polymerisation process is shown by the following example, which shows the observed variations in the conversion and microstructure of the polymers obtained.

Tests were carried out in a reactor having an internal capacity of 3 liters and provided with temperature monitoring and variable agitation systems and with means for conveying nitrogen, venting and discharging the polymer. The treatment of the raw materials and the charge order were the same as described in Example 1, i.e. 1440 ml of cyclohexane was introduced followed by 245.7 g of 1,3-butadiene and 27.3 g styrene. Next, 1.86 mmol of n-butyl-octyl magnesium and 0.373 mmol of triethyl aluminium were added, followed by 0.559 mmol of bis-(2-ethylhexyl) barium phosphate. This procedure was followed in three tests at different temperatures as shown in Table IV, together with the structural and composition parameters obtained in the polymers.

TABLE IV

|  | Temperature | R₂Mg | R₂'Ba | R₃"Al | % conversion | COMPOSITION OF COPOLYMER | | |
|---|---|---|---|---|---|---|---|---|
|  |  |  |  |  |  | Styrene | Butadiene | |
| Test | (0°) | (mmol) | (mmol) | (mmol) | (hours) | % total | % trans | %1,2 |
| 11 | 50 | 1.86 | 0.559 | 0.373 | 40 (7) | 3.2 | 88.4 | 1.9 |
| 12 | 70 | 1.86 | 0.559 | 0.373 | 62 (4.5) | 4.7 | 80.5 | 3.8 |
| 13 | 90 | 1.86 | 0.559 | 0.373 | 77 (2.0) | 6.5 | 74.6 | 5.8 |

Microstructure and composition: IR

Example 5

The following example shows the influence of the concentration of catalyst on the structure and molecular weight. It also shows the possibility of using branching agents such as divinyl benzene (DVB) for widening the distribution of molecular weights, which is desirable for some types of rubber so as to improve processing thereof.

Polymerisation tests were carried out in four bottles as described in Example 1, the bottles being given the same treatment by the same method. 330 ml of cyclohexane, 32.2 g of 1,3-butadiene and 8.1 g of styrene were introduced into each bottle, followed by the magnesium compound, the aluminium compound and the barium compound described in the previous examples and in the same order but in variable quantities as described in Table IV. In Test 17, when the reaction reached 80% conversion, 0.266 mmol of divinyl benzene (DVB) was added as a branching agent and the temperature was raised to 80° C., after which the reaction continued for 3 hours more. The Table also shows how the concentration of catalyst and the use of branching agents affects the molecular weight, inter alia by widening the distribution of molecular weights.

TABLE V

| Test | $R_2Mg$ (mmol) | $R_2'Ba$ (mmol) | $R_3'Al$ (mmol) | DVB (mmol) | % conversion | COMPOSITION OF COPOLYMER | | | | | |
|---|---|---|---|---|---|---|---|---|---|---|---|
| | | | | | | Styrene % total | Butadiene % 1,4-trans | % 1,2 | $\times 10^{-3}$ Mw | Mn | IH |
| 14 | 0.380 | 0.114 | 0.076 | — | 82 | 15.2 | 86.5 | 2.1 | 86 | 56 | 1.53 |
| 15 | 0.570 | 0.171 | 0.114 | — | 80 | 14.6 | 85.3 | 1.9 | 68 | 48 | 1.62 |
| 16 | 0.760 | 0.228 | 0.152 | — | 83 | 14.8 | 85.0 | 1.6 | 55 | 38 | 1.60 |
| 17 | 0.760 | 0.228 | 0.152 | 0.266 | 88 | 16.8 | 87.0 | 1.6 | 126 | 57 | 2.20 |

Microstructure and composition: IR
T: 50° C.
t: 24 hours + 3 h (80° C.) DVB

Example 6

The following example shows the possibility of preparing polymers with a different composition of monomers, the composition being influenced mainly by the initial concentration of the two monomers and by the conversion at the end of the reaction. To this end three tests were made, following the same procedure as in the previous examples and using glass bottles for polymerisation. Firstly, 320 ml of purified cyclohexane was placed in each bottle, with the quantities of 1,3-butadiene and styrene given in Table VI. Next, n-butyl-octyl magnesium, triethyl aluminium and bis (2-ethylhexyl) barium phosphate were placed in each bottle in the quantities given in the Table. The mixture was placed in a thermostatic bath at the stated temperature and kept agitated. In all cases the conversion was checked by extracting a sample at given intervals of time, and when approximately 80% was reached, the amount of divinyl benzene (DVB) defined in the Table was added in each test and the temperature was raised to 80° C., after which the reaction was continued for 4 additional hours. After this time the reaction was stopped as in the previous examples and the dry sample was obtained by the method already described in the previous examples.

Table VI shows the composition of each sample, the microstructure, composition and final conversion rate in each test.

TABLE VI

| Test | Supply (g) But. | Supply (g) st. | $R_2Mg$ (mmol) | $R_2'Ba$ (mmol) | $R_3'Al$ (mmol) | DVB (mmol) | T (°C.) | % conversion (h) | COMPOSITION OF COPOLYMER | | |
|---|---|---|---|---|---|---|---|---|---|---|---|
| | | | | | | | | | Styrene % total | Butadiene % 1,4-trans | % 1,2 |
| 18 | 34.7 | 8.7 | 0.532 | 0.160 | 0.106 | 0.186 | 80 | 91(7) | 15.5 | 80.3 | 4.4 |
| 19 | 34.4 | 3.0 | 0.532 | 0.160 | 0.106 | 0.186 | 80 | 94(6) | 4.7 | 81.0 | 3.0 |

Microstructure and composition: IR
t(coupling): 4 h (80° C.) DVB

We claim:

1. The method of preparing homopolymers of conjugated dienes or copolymers of conjugated dienes with another diene or with vinyl aromatic compounds in which the vinyl content is above 70%, characterized by use of a catalytic composition comprising:
   (a) an organomagnesium compound $MgR^1R^2$ (I), wherein $R^1$ and $R^2$ are selected from the group consisting of aliphatic, alicyclic or aromatic hydrocarbons radicals having from 2 to 20 carbon atoms, which may be the same or different,
   (b) an organoaluminium compound selected from the group consisting of those represented by following formulae (II) to (V):

$$R^3-Al-R^4 \atop R^5 \qquad (II)$$

$$(-O-Al(R^6)-) \qquad (III)$$

$$R^7-O-Al-R^8 \atop R^9 \qquad (IV)$$

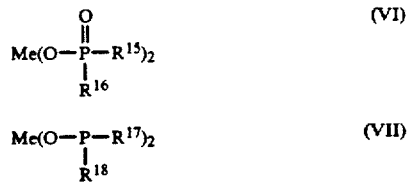
(V)

where the groups $R^3$ to $R^{14}$ can be H or the same or different radicals, selected from the group of normal, secondary or tertiary alkyl, cycloalkyl or aryl radicals containing 2 to 20 carbon atoms, and
   (c) an organic barium, strontium or calcium compound selected from the group consisting of those represented by the following formulae (VI) to (VII):

$$Me(O-\overset{\overset{O}{\|}}{P}-R^{15})_2 \atop R^{16} \qquad (VI)$$

$$Me(O-P-R^{17})_2 \atop R^{18} \qquad (VII)$$

where Me is at least one metal selected from the group consisting of Ba, Ca, Sr, where $R^{15}$ to $R^{18}$ are selected from the group consisting of alkyl, cycloalkyl, aryl, phenoxy or alkoxy from 4 to 20 carbon atoms, which may be the same or different.

2. The method according to claim 1 in which the conjugated diene is 1,3-butadiene and the vinyl aromatic compound is styrene.

3. The method of preparing copolymers according to claim 2 in which the incorporation of styrene is random, when both monomers are charged simultaneously, where the percentage of styrene in the copolymer is at least 5%.

4. The method according to claim 2, in which said conjugated diene and styrene are charged sequentially to prepare a block copolymer.

5. The method of preparing homopolymers or copolymers according to claim 1 in hydrocarbon solvents under inert atmosphere and at temperature between 0° to 150° C.

6. The method according to claim 1 in which the barium compound is barium bis(2-ethylhexyl)phosphate, and the magnesium and aluminium compound are n-butyl-octyl magnesium and triethyl aluminum respectively, forming a completely soluble catalyst system in hydrocarbon solvents.

7. The method according to claim 1 where the mol ratio of the barium compound to the magnesium compound is from 0.1/1.0 to 2.0/1.0, and the mol ratio of the magnesium compound to the aluminium compound is from 2/1 and 100/1.

8. The method according to claim 2 for preparing branched homopolymers or copolymers wherein a divinyl aromatic compound is used as a chain extender or branching agent to obtain a wide distribution of molecular weights.

9. The method according to claim 8 in which the mol ratio of chain extender or branching agent to magnesium compound is from 0.1/1 to 3.0/1.

10. The method according to claim 8 in which the chain extender or branching agent is divinylbenzene.

11. The method according to claim 5 wherein the hydrocarbon solvent is cyclohexane.

12. The method according to claim 6 where the hydrocarbon solvent is cyclohexane.

* * * * *